United States Patent [19]

Mizutani et al.

[11] 3,868,314

[45] Feb. 25, 1975

[54] ION EXCHANGE MEMBRANES

[75] Inventors: Yukio Mizutani, Tokuyama; Koshi Kusumoto, Shinnanyo; Yosinori Mizumoto, Kudamatsu, all of Japan

[73] Assignee: Tokuyama Soda Kabushiki Kaisha, Yamaguchi-ken, Japan

[22] Filed: Feb. 15, 1974

[21] Appl. No.: 442,843

Related U.S. Application Data

[62] Division of Ser. No. 307,852, Nov. 20, 1972, Pat. No. 3,821,127.

[30] Foreign Application Priority Data

Nov. 26, 1971 Japan.............................. 46-94513

[52] U.S. Cl. ................................. 204/296, 210/500
[58] Field of Search ............ 204/296, 295; 210/500

[56] References Cited
UNITED STATES PATENTS

| | | | |
|---|---|---|---|
| 3,341,479 | 9/1967 | Aftergut........................... | 204/296 X |
| 3,510,417 | 5/1970 | Mizutani et al..................... | 204/180 |
| 3,510,418 | 5/1970 | Mizutani et al..................... | 204/181 |
| 3,562,139 | 2/1971 | Leitz................................ | 204/296 |
| 3,686,100 | 8/1972 | Novara et al.................... | 204/296 X |

FOREIGN PATENTS OR APPLICATIONS 250,282   4/1964   Australia............................. 204/296

*Primary Examiner*—F. C. Edmundson
*Attorney, Agent, or Firm*—Sherman & Shalloway

[57] ABSTRACT

An ion exchange membrane, which is made by sulfonating a membranous polymer having functional groups suitable for introduction of ion exchange groups, under mild conditions first at the surface of the membrane and then gradually towards its interior, thereby to introduce sulfonic acid groups into said functional groups present in the surface, or its vicinity, of the membrane, and then introducing anoion exchange groups into the remainder of the functional groups to convert said membranous polymer to an anion exchange membrane; wherein said sulfonation is carried out under conditions which will provide a sulfonic acid group equivalent of 0.05 to 20 percent based on the total ion exchange groups, and a ratio of the direct current resistance of the anion exchange membrane to its alternate current resistance of not more than the limiting resistance ratio.

3 Claims, 3 Drawing Figures

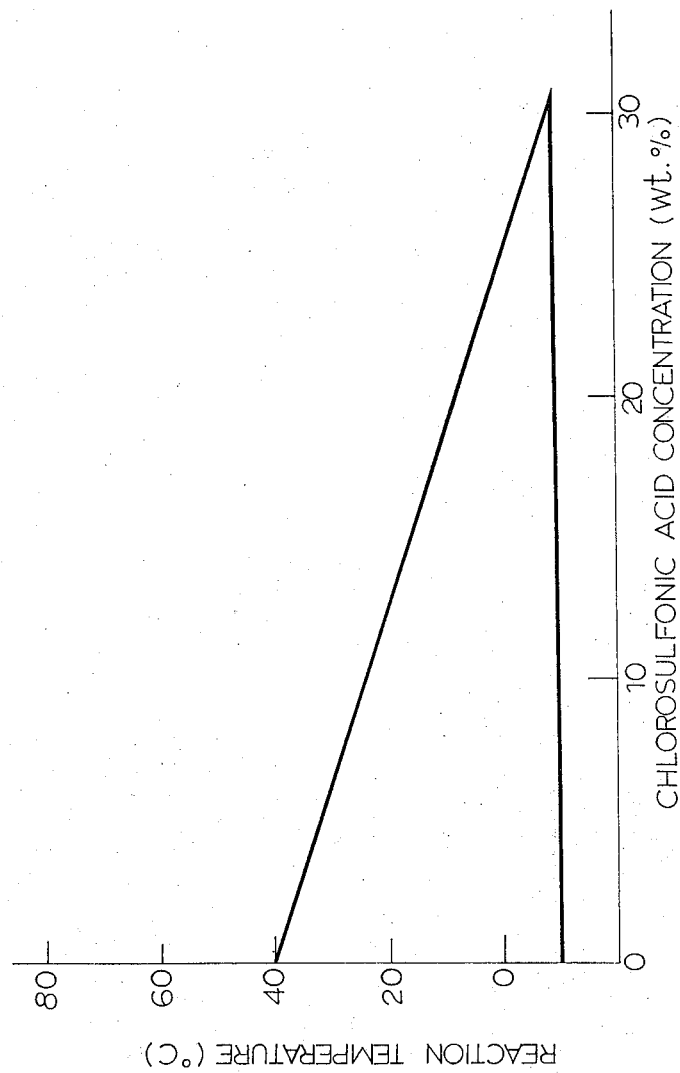

ION EXCHANGE MEMBRANES

This is a division of application Ser. No. 307,852, filed Nov. 20, 1972, now U.S. Pat. No. 3,821,127.

This invention relates to an anion exchange membrane which permits a selective permeation of anions, and to a method of making said anion exchange membrane. More specifically, the invention relates to a method of making an anion exchange membrane, which comprises sulfonating a membranous polymer having functional groups suitable for introduction of ion exchange groups, under mild conditions to a specified extent first at the surface of the membrane and then gradually towards its interior, and then introducing anion exchange groups to provide an anion exchange membrane containing 0.05–20 equivalent % of sulfonic acid groups based on the total ion exchange groups.

In the anion exchange membrane produced by the method of this invention, the sulfonic acid groups are present only in the surface, or its vicinity, of the membrane, and the density of the sulfonic acid groups decreases progressively from the surface of the membrane towards its interior, until at the central part of the membrane at a certain depth from its surface, the sulfonic acid groups are substantially absent. In this central part, only the anionic exchange groups are present as ion exchange groups. The anion exchange membrane of this invention is further characterized by the fact that the ratio of its direct current membrane resistance $R_D$ (ohm cm$^2$) to its alternate current membrane resistance $R_A$ (ohm cm$^2$) is not more than the "limiting resistance ratio" to be defined hereinbelow.

Various methods have been known to produce anion exchange membranes. However, the known anion exchange membranes have the defect of being susceptible to considerable contamination by organic matters contained in water to be treated, such as humic acid or various surface active agents, as is described, for example, in Desalination, 8, 195-220 (1970), and Proceedings of the Third International Symposium on Desalination of Sea Water, Vol. 2, pages 141–153 (1970). As a result, in the desalination of water, the electric resistance increases with time, and on the other hand, the current efficiency decreases. Furthermore, even at a low current density, the electrolysis of water occurs on the surface of the ion exchange membrane (this phenomenon is described as neutrality disturbance phenomenon), which results in pH variations of the water to be treated. This causes the precipitation of alkaline earth metals in the water as scales, and finally leads to the necessity for stopping the operation. It has therefore been strongly desired to exploit ion exchange membranes which have resistance to contamination by organic matters.

In this regard, there were proposed methods of making ion exchange membranes with resistance to contamination by organic matters (see, for example, Polymer Science, Part B, Polymer Letter, page 533 (1967), Polymer Science, Part C, 22, page 157 (1968), and Saline Water Conversion Report, 1969–1970 edition, page 124, Bureau of Saline Water, Department of the Interior). However, difficulties such as the reduction in current efficiency and the increase in electrical resistance have not been overcome by these methods.

It is an object of this invention to provide an anion exchange membrane which has good resistance to contamination by organic matters and can retain high current efficiency and low electric resistance.

Another object of this invention is to provide a method of making an anion exchange membrane having resistance to contamination by organic matters using a simplified procedure.

According to this invention, there is provided a method of making an anion exchange membrane, which comprises sulfonating a membranous polymer having functional groups suitable for introduction of ion exchange groups, under mild conditions first at the surface of the membrane and then gradually towards its interior, thereby to introduce sulfonic acid groups into said functional groups present in the surface, or its vicinity, of the membrane, and then introducing anion exchange groups into the remainder of the functional groups to convert said membranous polymer to an anion exchange membrane; wherein said sulfonation is carried out under conditions which will provide a sulfonic acid group equivalent of 0.05 to 20 percent based on the total ion exchange groups, and a ratio of the direct current resistance of the anion exchange membrane to its alternate current resistance of not more than the limiting resistance ratio.

Furthermore, the present invention provides an anion exchange membrane containing both cation exchange groups and anion exchange groups, said cation exchange groups being sulfonic acid groups which are present on the surface, or its vicinity, of the ion exchange membrane, the density of the sulfonic acid groups progressively decreasing from the surface of the membrane towards its interior, the amount of the sulfonic acid groups being 0.05 to 20 equivalent % based on the total amount of the ion exchange groups, the amount of said anion exchange groups being 80 to 99.95 equivalent % based on the total amount of the ion exchange groups, and said ion exchange membrane having a ratio of direct current membrane resistance to alternate current membrane resistance of not more than the limiting resistance ratio.

The invention will be further described by reference to the accompanying drawings in which:

FIG. 3 shows the range of preferred reaction condition to be employed when a chlorosulfonic acid-sulfuric acid system is used as a sulfonating agent.

By the term "membranous polymer having functional groups suitable for introduction of ion exchange groups" (which may sometimes be referred to simply as a base membrane hereinafter) is meant a membranous polymer which contains as said functional groups a benzene ring, naphthalene ring, etc. which may optionally contain a substituent such as an alkul group, halogen, haloalkyl group or hydroxy group. Such a polymer per se is well known in the art. The membranous polymer can be produced by polymerizing or copolymerizing monomers selected from styrene, vinyl toluene, vinyl naphthalene, divinyl benzene or nucleus-substituted products thereof. It can also be obtained, for example, by the condensation reaction between phenol and formaldehyde.

The base membrane that can be used in this invention is not particularly limited, if it is the membraneous polymer having functional groups suitable for introduction of ion exchange membranes. It may be of the polymerized type, condensed type, homogeneous type, heterogeneous type, or any other desired structure, irrespective of the presence of a reinforcing core material or the difference of the method of production, for example, the number of functional groups suitable for introduction of ion exchange groups.

Figure 1:
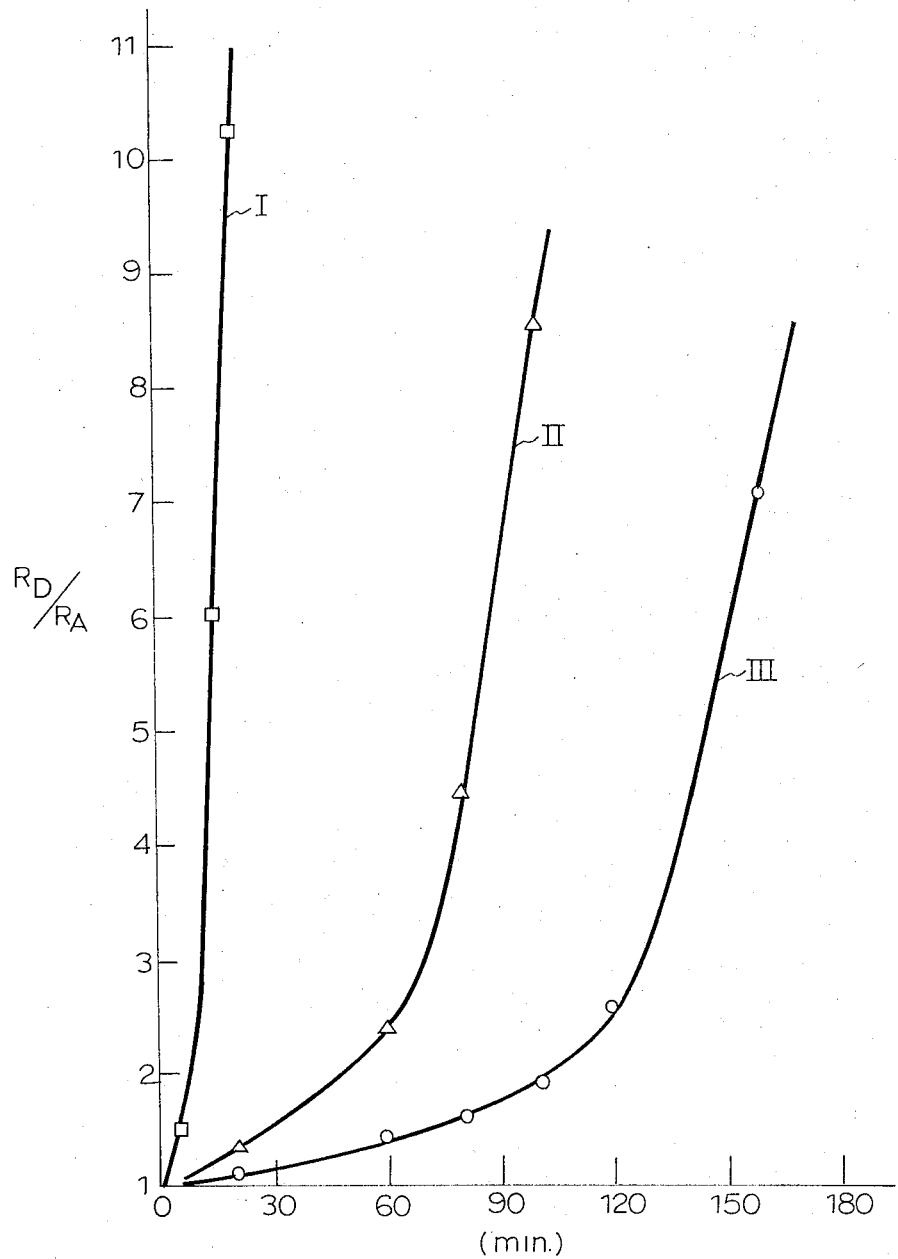
FIG. 1 is a graphic representation showing the relation between the ratio ($R_D/R_A$) of the direct current membrane resistance ($R_D$) to the alternate membrane current resistance ($R_A$) to the anion exchange membrane produced by the method of this invention, and the sulfonation reaction time.

The term "limiting resistance ratio" used herein will be explained by reference to FIG. 1, which is a graphic representation showing the relation between the sulfonation reaction time and the ratio of $R_D/R_A$ when the base membrane produced by the method described in Example 1 to be given later is converted to an anion exchange membrane by the same method as in Example 3. In FIG. 1, curves I, II and III represent the relations obtained when the sulfonation reaction is carried out at 60°C., 50°C., and 40°C. respectively. FIG. 1 shows that the ratio of $R_D/R_A$ increases abruptly with a certain reaction time. This abrupt increase in $R_D/R_A$, which will be described in detail later, is generally a phenomenon which is observed only when the sulfonation is carried out under mild conditions. Where such a phenomenon is observed, the value of the ratio $R_D/R_A$ corresponding to the point at which the abrupt increase begins is defined herein as the limiting resistance ratio. The limiting resistance ratio value somewhat varies according to the kind of the base membrane or the sulfonating reaction conditions, but is generally within the range of 2.0 to 3.0. In many cases, it is about 2.3, and it never becomes less than 2.0.

Ion exchange membranes containing both cation exchange groups and anion exchange groups have been known to some extent. In these known amphoteric membranes, the anion exchange groups and the cation exchange groups present in the membranes are distributed substantially uniformly in the membranes, and by varying the ratio between the amount of the cation exchange groups and that of the anion exchange groups, it is possible to allow the membrane to have the properties of either a cation exchange membrane or an anion exchange membrane more strongly to a greater extent. However, even when the ratio of the cation exchange groups to the anion exchange groups is changed, the ratio $R_D/R_A$ does not substantially change. When these membranes are used for electrical dialysis of an aqueous solution containing harmful organic matters, they do not have resistance to contamination by organic matters as in the anion exchange membrane of the present invention, but are contaminated by organic matters to the same extent as ordinary ion exchange membranes to cause disadvantages such as those already described above.

Journal of Applied Chemistry 6, 511 (1956) reported that by bonding a membrane having anion exchange groups to a membrane having cation exchange groups, there was obtained an ion exchange membrane containing both anion exchange groups and cation exchange groups. Membranes of this kind are generally called bipolar membranes, and are characterized by having the property of permitting a selective permeation of smaller one of ions having the same electric charge at the time of electric dialysis. However, since electric resistance increases markedly, it is impossible to avoid defects arising from the neutrality disturbance phenomenon. Furthermore, the technique of bonding two membranes to each other is difficult, and the resulting membrane becomes thicker.

We have made an extensive work on the method of obtaining an anion exchange membrane by introducing a specified amount of sulfonic acid groups into a base membrane and then introducing anion exchange membranes into the remaining functional groups. As a result, we unexpectedly found that when mild sulfonating reaction conditions are employed, an abrupt increase in the $R_D/R_A$ value is observed as shown in FIG. 1, and that a product having the $R_D/R_A$ value below the limiting resistance ratio differs extremely in properties as an anion exchange membrane from a product having the $R_D/R_A$ value larger than the limit. It has been found that only when the sulfonation is carried out in the above-mentioned method under mild sulfonating conditions first at the surface of the membrane and then gradually toward its interior to introduce sulfonic acid groups in an amount of 0.05 to 20 equivalent % based on the total amount of ion exchange groups and provide a final product having the $R_D/R_A$ value of not more than the limiting resistance ratio, the resulting anion exchange membrane shows excellent resistance to contamination by harmful organic matters contained in water to be treated, and hardly exhibits a rise in electric resistance and a decrease in current efficiency with time and also a neutrality disturbance phenomenon.

If the above method is carried out under severe conditions ordinarily employed in the manufacture of cation exchange membtanes containing sulfonic acid groups, for example, if sulfonation is carried out at 80°C. using concentrated sulfuric acid and then anion exchange groups are introduced to form an anion exchange membrane, the ratio of $R_D/R_A$ of the anionic exchange membrane becomes extremely large even when the sulfonation reaction time is very short. Hence, severe sulfonating reaction conditions give very different results from the mild sulfonating reaction conditions under which the ratio $R_D/R_A$ is relatively small in the early stage of reaction. Furthermore, in the case of the mild sulfonating reaction conditions, the rate of increase of $R_D/R_A$ is very slow in the early stage of the reaction, whereas under the severe sulfonating reaction conditions, the ratio $R_A/R_D$ rises abruptly with the passage of the reaction time from the early stage of reaction. Even if the amount of sulfonic acid groups is 0.05 to 20 equivalent % based on the total amount of ion exchange groups as a result of sulfonation under severe sulfonating conditions, the resulting anion exchange membrane has far poorer resistance to contamination to organic matters, and the results with respect to the variations of the electrical resistance and current efficiency with time and the neutrality disturbance phenomenon are poor. For example, when the base membrane produced under the conditions disclosed in Example 1 was sulfonated at 100°C. using 98 % sulfuric acid, the ratio $R_D/R_A$ reached more than 10 within a period as short as one minute.

When the cross section of the anion exchange membrane produced by the method of this invention under the mild sulfonating reaction conditions and that of the anionic exchange membrane produced by the same method but employing severe sulfonating reaction conditions were dyed with a basic dye and observed by a color microscopic photograph, the surface part of the anion exchange membrane obtained under the mild sulfonating conditions was dyed most dark, and the color became lighter progressively towards the interior of the membrane. The central part was not dyed at all. On the other hand, in the case of the anion exchange membrane obtained under the severe sulfonating conditions, the surface portion was dyed dark in a uniform depth, and a non-dyed region existed adjacent to the dyed region. The two regions were partitioned by a clear boundary line, and the transition from the dark shade to the light shade is very abrupt. Such a difference in dyeing shows that there is an outstanding difference in the distribution of the sulfonic acid groups within the interior of the anion exchange membrane, and because of this microscopic difference in internal structure, the above-mentioned marked difference in the properties of the ion exchange membrane are considered to be brought about.

It has not been fully elucidated why such a difference in internal structure results from the difference in sulfonating conditions, but this may be reasonably ascribed to the following explanation. When the base membrane is sulfonated under severe conditions, the rate of introduction of sulfonic acid groups is very fast, and the rate of sulfonating reaction as a whole is determined mainly by the rate of diffusion of a sulfonating agent into the membrane. When the sulfonating agent diffuses into the interior of the membrane and the functional groups of the base membrane come into contact with the sulfonating agent, sulfonic acid groups are intoduced into almost all of these functional groups. As a result, at the surface of the base membrane, sulfonic acid groups are introduced into all of the functional groups. On the other hand, anion exchange groups introduced later are hardly present on the surface of the base membrane, but are present exclusively in its interior. The resulting anion exchange membrane is therefore a bipolar membrane in which there is a clear boundary between a layer of the cation exchange groups (sulfonic acid groups) and a layer of the anion exchange groups, and is considered to give a dyed image having a clear boundary as described above. In an anion exchange membrane of such an internal structure, the ratio $R_D/R_A$ becomes very great even when the reaction time is extremely short and the amount of the sulfonic acid groups to be introduces is relatively small.

On the other hand, when the base membrane is sulfonated under mild conditions, the overall reaction rate is determined by the rate of introduction of sulfonic acid groups rather than the rate of diffusion of a sulfonating agent. Therefore, even at the surface of the base membrane, sulfonic acid groups are not introduced into all of the functional groups. The density of the sulfonic acid groups present is highest at the surface of the membrane and becomes progressively lower towards its interior. When anion exchange groups are introduced afterwards, they are introduced also into those functional groups present on the surface of the membrane into which the sulfonic acid groups have not been introduced, and the density of the anion exchange groups present becomes progressively higher towards the interior of the membrane, until at last only the anion exchange groups are present in the central core portion.

The anion exchange membrane of this invention having such a unique distribution of ion exchange groups is essentially different from either of the conventional amphoteric membranes (with a uniform distribution of cation and anion exchange groups) or the conventional bipolar membranes.

It is essential in the present invention that the amount of sulfonic acid groups to be introduced into the anion exchange membrane should be within the range of 0.05 to 20 equivalent percent based on the total amount of the ion exchange groups. The preferred amount is 0.1 to 10 equivalent percent. If the amount of the sulfonic acid groups is less than 0.05 equivalent percent, the resulting anion exchange membrane does not possess satisfactory resistance to contamination by organic matters, and if, on the other hand, the amount of the sulfonic acid groups exceeds 20 equivalent percent, the transport number of the resulting anion exchange membrane decreases.

Examples of the sulfonating agent that can be used in the present invention include a mixture of sulfuric acid and water, sulfuric acid, a mixture of chlorosulfonic acid and sulfuric acid, and chlorosulfonic acid. When chlorosulfonic acid is used, chlorosulfonic acid groups are introduced instead of the sulfonic acid groups, and therefore, it is necessary to hydrolyze the chlorosulfonic acid groups to sulfonic acid groups by a customary method. The severeness of the reaction conditions with the use of such a sulfonating agent is determined mainly depending upon the type, concentration and temperature of the sulfonating agent used. For example, chlorosulfonic acid used alone is the most vigorous sulfonating agent, and next comes the mixture of chlorosulfonic acid and sulfuric acid. The mixture of sulfuric acid and water is the mildest sulfonating agent. Needless to say, the reaction conditions are severer with higher temperatures and concentrations. If the sulfonating time required for the ratio $R_D/R_A$ of the anion exchange membrane to reach the limiting resistance ratio (this time will be referred to as the limit reaction time) is too short in commercial practice, it is difficult to control the productional steps or stabilize the quality of the product. For stable operational conditions, it is desirable that the limit reaction time is at least 10 minutes, preferably at least 60 minutes. If the reaction conditions are too mild, the required reaction time becomes too long, and of course, this is commercially not advisable. From this viewpoint, the preferred reaction conditions are generally shown in FIGS. 2 and 3, although differing somewhat according to the kind of the base membrane used.

Figure 2:
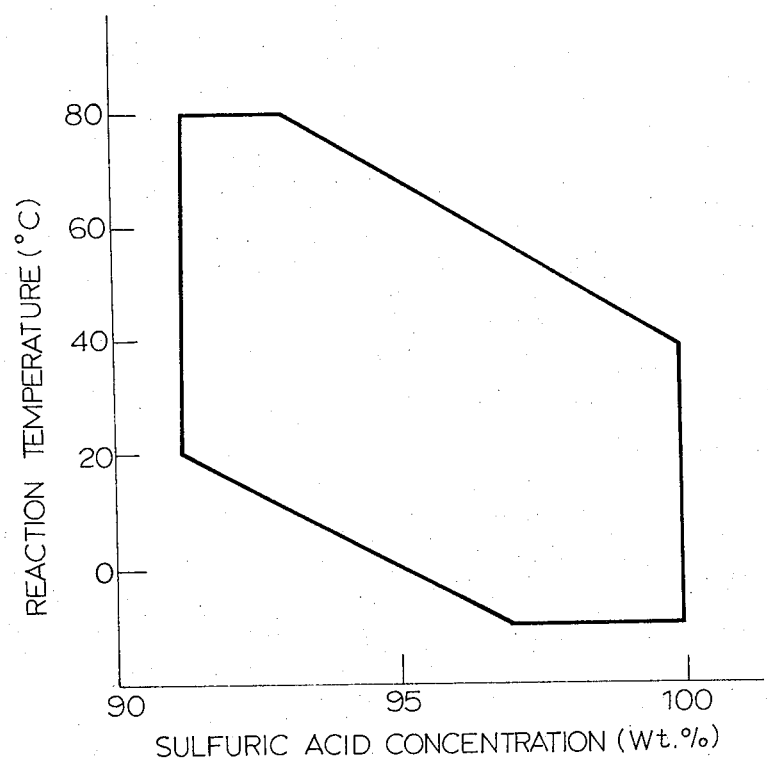
FIG. 2 shows the range of preferred reaction condition to be employed when a sulfuric acid-water system si used as a sulfonating agent.

FIG. 2 shows the conditions with respect to the mixture of sulfuric acid and water. If the concentration of sulfuric acid is lower than 91 percent by weight, it is very difficult to introduce sulfonic acid groups into a base membrane. The preferred concentration is 92 to 98 % by weight, especially 95 to 98 percent by weight. FIG. 3 shows the reaction conditions with respect to the mixture of chlorosulfonic acid and sulfuric acid. As compared with the sulfuric acid-water system, it is necessary to lower the temperature. If chlorosulfonic acid alone is used, the reaction temperature must be further lowered. Generally, the reaction temperature should be maintained at below room temperature, preferably at 0°C. to –30°C. In view of the ease of control of the reaction conditions and other factors, the mixture of sulfuric acid and water is a most preferred sulfoniating agent.

Once the sulfonating agent, its concentration and the reaction temperature have been selected, the reaction time may be determined on the basis of the standard that the ratio $R_D/R_A$ of the anion exchange membrane finally obtained should not exceed the limiting resistance ratio. This can be done easily by those skilled in the art.

Anion exchange groups are then introduced into the sulfonated base membrane to form an anion exchange membrane. The introduction of the anion exchange groups can be performed by any known method. The anion exchange groups are not restricted, and may be any known anion exchange groups which yield positive charge upon dissociation. Examples of the anion exchange groups are primary, secondary or tertiary amino groups, quaternary ammonium salt groups, phosphonium salt groups, sulfonium salt groups, stibonium salt groups, arsonium salt groups, and cobaltocene salt groups, etc. Generally, in commercial practice, there is conveniently employed a method wherein the sulfonated membrane is immersed for 2–4 hours for example, in a mixed solution of a haloalkyl ether such as chloromethyl ether and carbon tetrachloride using tin tetrachloride as a catalyst, and then aminated with an amine solution, thereby to introduce anion exchange groups into the base membrane.

The anion exchange membrane obtained by the method of this invention has a high level of resistance to contamination to organic matters such as humic acid or surface active agents present in water to be treated. Even when the anion exchange membrane of this invention is used continuously for a prolonged period of time, a rise in electric resistance and a decrease in current efficiency as in the conventional anion exchange membranes can be prevented almost completely. Even in a prolonged continuous operation, the anion exchange membrane of this invention does not cause a change in the pH of the water treated as a result of neutrality disturbance phenomenon. Therefore, the anion exchange membrane of this invention can be used for concentrating sea water to obtain concentrated brine, obtaining the re-usable water from river water or contaminated waste water, refining solutions containing electrolytic organic matters to remove such organic matters, and especially for producing potable water from water containing organic matters.

The invention will be described more specifically by the following Examples and Comparative Examples which in no way limit the present invention. In these Examples and Comparative Examples, all parts and percentages are by weight unless otherwise stated. The properties of the ion exchange membrane shown in the Examples and Comparative Examples were measured by the following methods.

Degree of Contamination

The ion exchange membrane is placed in 120 cc. two-compartment cell made of an acrylic resin and equipped with an agitator. The cathode compartment is filled with 0.05–NaCl and organic anions, and the anode compartment is filled with 0.05–NaCl. Electricity is passed for a certain period of time at a current density of $2 MA/cm^2$, while agitating at a speed of 1,500 r.p.m. Voltage variations on both sides of the membrane are detected by a detecting silver chloride electrode, and voltage drop between the both sides of the said membrane with time is recorded by an X-t recorder. The difference ($\Delta E$) between the voltage drop and that in the absence of organic anions is made a measure of the degree of contamination of the membrane.

Degree of Adsorption of Organic Anions to the Ion-exchange Membrane

Using the same apparatus as used for the measurement of the degree of contamination, electricity is passed in the same way. Then 5 cc of the solution in the cathode compartment and the anode compartment is sampled every given time interval. The ultraviolet absorption spectrum of the sampled solution is determined, and changes in the decrease of the concentration of organic anions in the cathode compartment are measured. Separately, a polyethylene film is set in the apparatus instead of the anion exchange membrane, and the decrease in the concentration of organic anions due to adhesion within the cell is measured. By subtracting the above-described decrease in the concentration of organic anions from this value, the degree of adsorption of the anion exchange membrane is obtained.

Polarization Phenonmenon (Neutrality Disturbance Phenomenon)

Using the same apparatus as used in the measurement of the degree of contamination, electricity is passed for a given time by the same procedure. Changes in the pH of the solution in the cathode and anode compartments are measured by a pH meter.

Direct Current Resistance of the Anion Exchange Membrane

The ion exchange membrane is placed in a 80 cc. two-compartment cell made of vinyl chloride resin, and 0.5N NaCl solution is filled on both sides of the ion exchange membrane. In a stationary condition, electricity is passed at 25°C. at a current density of 20 $MA/cm^2$. The electric potential between both sides of the membrane is detected using a detecting silver chloride electrode. The difference $\Delta V$ (mV) between it and the electrical potential between electrodes in the basence of the ion exchange membrane is calculated. The direct current resistance (ohm-cm$^2$) of the ion exchange membrane is defined as $\Delta V$ mV/20 $MA/cm^2$. In this measurement, the ion exchange membrane used is equilibrated in advance in a 0.5N NaCl solution.

Alternate Current Resistance of the Anion Exchange Membrane

The ion exchange membrane is placed in a two-compartment cell made of an acrylic resin and including a platinum black electrode plate, and a 0.5N NaCl solution is filled on both sides of the ion exchange membrane. By an alternating bridge (frequency 1,000 cycles/second), the resistance of the membrane between the electrodes is measured at 25°C. The difference between it and the interelectrode resistance in the absence of the anion exchange membrane is calculated, and made an alternate current resistance (ohms-cm$^2$). The anion exchange membrane used in the above measurement is equilibrated in advance in a 0.5N NaCl solution.

Transport Number

A 0.5N NaCl solution and a 2.5N NaCl solution are filled in the cell on both sides of the anion exchange membrane, and the voltage of the membrane at 25°C. between said solutions is measured. The transport number is calculated from the Nernst equation (F. Helfferich, Ion Exchange, page 375, 1962, McGraw-Hill).

Amount of Sulfonic Acid Groups Introduced

The sulfonic acid groups introduced into the base film are converted completely to the H type, and then the base membrane is immersed overnight in a saturated aqueous saline solution to convert it to the Na type. The $H^+$ liberated at this time is titrated with a 0.1N NaOH solution. The amount of the sulfonic acid groups is calculated by dividing the neutralization equivalent by the weight of the base membrane in the dried state.

Total Ion Exchange Number (Ion Exchange Capacity)

The base membrane is sulfonated by being immersed in 98 % sulfuric acid for 16 hours at 60°C. The sulfonic acid groups introduced are converted completely to the H type, and then the base membrane is immersed overnight in a saturated aqueous saline solution to convert it to the Na type. The $H^+$ liberated at this time is titrated with a 0.1N NaOH solution. The number of ion exchange groups is calculated by dividing the neutralization equivalent by the weight of the membrane in the dried state.

Example 1

A paste consisting of 10 parts of 50 % purity divinyl benzene, 90 parts of styrene, 15 parts of polyvinyl chloride powder, 30 parts of dioctyl phthalate and 2 parts of benzoyl peroxide was coated on a cloth of polyvinyl chloride (commercially available under the tradename Teviron), and both coated surfaces are bonded to a film of polyvinyl alcohol (commercially available under the tradename Vinylon). This assembly was heated for 4 hours at 120°C. The base membrane obtained had a total ion exchange capacity of 2.4 meq/g based on its dry weight. The base membrane was immersed for 24 hours in 98 % sulfuric acid at 15°C., and then washed first with 80 % sulfuric acid and then with 40 % sulfuric acid, followed by further washing with water and a methanol solution and drying at reduced pressure. The amount of sulfonic acid groups introduced into the base membrane was 0.14 meq/g (based on the dry weight of the membrane). The base membrane was then immersed in a solution consisting of 250 parts of chloromethyl ether, 750 parts of carbon tetrachloride and 36 parts of tin tetrachloride, and chloromethylated at room temperature for 4 hours. The base membrane was then washed with a methanol solution and then aminated by being treated with a 10 % aqueous solution of trimethylamine thereby to form an anion exchange membrane. The anion exchange membrane so obtained had an alternate current resistance of 2.4 ohms $cm^2$ and a direct current membrane resistance of 2.7 ohms $cm^2$. The ratio of the sulfonic acid groups to the total ion exchange groups was 5.83 percent. The transport number of the anion exchange membrane was 90 percent. Using this anion exchange membrane and 100 ppm of a solution of sodium dodecylbenzenesulfonate as organic anions, the degree of contamination of the membrane and the degree of adsorption of the organic anions to the membrane were measured, and the results are shown in Table 1.

Table 1

| Time of passing electricity (hrs.) | | 0 | 1 | 2 | 6 | 12* |
|---|---|---|---|---|---|---|
| Degree of contamination $\Delta E(mV)$ | | 0 | 0 | 0 | 0 | 0 |
| pH change | Anode compartment | 6.4 | 6.3 | — | 6.5 | 6.5 |
| | Cathode compartment | 6.5 | 6.4 | — | 6.4 | 6.5 |
| Concentration of organic anions (ppm) | Anode compartment | 0 | 0 | 0 | 0 | — |
| | Cathode compartment | 100 | 98 | 97 | 95 | — |

*After passing electricity for 6 hours, the passing of electricity was stopped for 24 hours, and the electricity was again passed.

For comparison, the base membrane obtained by the above experiment was chloromethylated and aminated under the same conditions without prior sulfonation, to form an anion exchange membrane. This anion exchange membrane had an alternate current membrane resistance of 2.2 ohms $cm^2$, a direct current resistance of 2.4 ohms $cm^2$, and a transport number of 90 percent. The degrees of contamination and adsorption were examined by the same procedures as above. The results are shown in Table 2.

Table 2

| Time of passing electricity (minutes) | | 0 | 5 | 10 | 20 | 60 |
|---|---|---|---|---|---|---|
| Degree of contamination $\Delta E(mV)$ | | 0 | 1050 | 3350 | 5850 | 9850 |
| pH changes | Anode compartment | 6.4 | — | — | — | 10.0 |
| | Cathode compartment | 6.4 | — | — | — | 4.0 |
| Concentration of organic anions (ppm) | Anode compartment | 0 | — | 0 | 0 | 0 |
| | Cathode compartment | 100 | — | 90 | 86 | 72 |

EXAMPLE 2

An anion exchange membrane obtained by the same method as in Example 1, and its properties were examined using organic anions of the concentrations shown in Table 3 instead of the sodium dodecylbenzenesulfonate used in Example 1. The results are shown in Table 3 as Nos. 1 to 3. Nos. 4 to 6 refer to the results obtained with anion exchange membranes which were made by the same method as in Example 1 except that the base membrane was not sulfonated.

Table 3

| Nos. | Organic Anions | | Time of Passing Electricity | | | | | | | |
| | | | 0 | | | 3 hours | | | 6 hours[3] | |
| | Types | Concentration (ppm) | Degree of contamination $\Delta E(mV)$ | pH changes + | - | Degree of contamination + $\Delta E(mV)$ | pH changes - nation | | Degree of contamination + $\Delta E(mV)$ | pH changes - nation |
|---|---|---|---|---|---|---|---|---|---|---|
| 1 | Dialkyl ester of | 100 | 0 | 6.5 | 6.4 | 0 | 6.5 | 6.4 | 0 | 6.5 | 6.3 |

Table 3 -Continued

| Nos. | Organic Anions Types | Concentration (ppm) | Time of Passing Electricity | | | | | | |
|---|---|---|---|---|---|---|---|---|---|
| | | | 0 | | | 3 hours | | 6 hours[3] | |
| | | | Degree of contamination ΔE(mV) | pH changes [1]+ | pH changes − | Degree of contamination + ΔE(mV) | pH changes + | pH changes − nation | Degree of contamination + ΔE(mV) | pH changes + | pH changes − nation |

| Nos. | Types | Concentration (ppm) | Degree of contamination ΔE(mV) at 0 | pH changes + | pH changes − | Degree of contamination + ΔE(mV) 3h | pH changes + | pH changes − | Degree of contamination + ΔE(mV) 6h | pH changes + | pH changes − |
|---|---|---|---|---|---|---|---|---|---|---|---|
| | sulfosuccinic acid | | | | | | | | | | |
| 2 | Sodium laurylsulfonate | 62 | 0 | 6.4 | 6.3 | — | — | — | 40 | 6.5 | 6.3 |
| 3 | [4] Wetting agent No. 62 | 5 (cc/l) | 0 | — | — | 15 | — | — | 160 | — | — |
| 4 | Dialkyl ester of sulfosuccinic acid | 100 | 0 | 6.4 | 6.4 | 75 | 6.5 | 6.4 | — | — | — |
| 5 | Sodium laurylsulfonate | 62 | 0 | 6.3 | 6.5 | — | — | — | 250 | 7.7 | 5.2 |
| 6 | [4] Wetting agent No. 62 | 5 (cc/l) | 0 | — | — | 600 | — | — | — | — | — |

[1] + is an abbreviation for an anode compartment.
[2] − is an abbreviation for a cathode compartment
[3] Electricity was passed for 3 Hours, stopped for 24 hours, and again passed for 3 hours.
[4] Wetting agent No. 62 (trademark for a product of Ebara-Udylite).

EXAMPLE 3

Example 1 was repeated except that the sulfonating conditions were changed as shown in Table 4. The properties of the resulting anion exchange membranes are shown in Table 4.

treatment of the base membrane with sulfuric acid was carried out at 60°C. and the treatment time was changed as shown in Table 5. The properties of the anion exchange membranes obtained are shown in Table 5.

Table 4

| No. | Sulfonating conditions Temperature(°C) | Time (min.) | Amount of sulfonic acids introduced (meq/g of dry membrane) | %[1] | $R_D/R_A$ | Transport number (%) | pH change in cathode and anode[2] compartments | Degree of contamination[3] Δ E (mV) |
|---|---|---|---|---|---|---|---|---|
| 1 | — | — | 0 | 0 | 1.1 | 90.1 | No change | 1050 |
| 2 | 15–16 | 300 | 0.0038 | 0.16 | 1.1 | 90.0 | do. | 0 |
| 3 | do. | 600 | 0.072 | 3.0 | 1.2 | 90.0 | do. | do. |
| 4 | 25 | 90 | 0.025 | 1.02 | 1.1 | 90.3 | do. | do. |
| 5 | do. | 180 | 0.14 | 5.8 | 1.1 | 90.3 | do. | do. |
| 6 | do. | 300 | 0.30 | 12.5 | 1.3 | 88.2 | do. | do. |
| 7 | do. | 510 | 0.46 | 19.2 | 1.7 | 85.3 | do. | do. |
| 8 | 40 | 20 | 0.015 | 0.63 | 1.1 | 90.6 | do. | do. |
| 9 | do. | 40 | 0.075 | 3.1 | 1.2 | 90.6 | do. | do. |
| 10 | do. | 60 | 0.15 | 6.2 | 1.4 | 90.1 | do. | do. |
| 11 | 50 | 20 | 0.11 | 4.6 | 1.4 | 89.7 | do. | do. |
| 12 | 50 | 30 | 0.20 | 8.3 | 1.6 | 88.6 | do. | do. |
| 13 | 50 | 35 | 0.23 | 9.2 | 1.7 | 88.5 | do. | do. |
| 14 | 50 | 40 | 0.29 | 12.1 | 1.8 | 87.5 | Anode compartment 8.6 Cathode compartment 5.5 | do. |
| 15 | 60 | 5.0 | 0.042 | 1.75 | 1.5 | 90.1 | No change | do. |
| 16 | do. | 10 | 0.08 | 3.3 | 2.5 | 89.5 | Anode compartment 11.7 Cathode compartment 2.4 | do. |
| 17 | do. | 2.0 | 0.23 | 9.6 | 10.5 | 85.4 | Anode compartment 12.0 Cathode compartment 2.2 | do. |

[1] Proportion of the sulfonic acid groups based on the total ion exchange groups
[2] Effects on the pH of 0.05N–NaCl solution after passing electricity for 3 hours at a current density of 2 mA/cm²
[3] E obtained after passing electricity for 6 hours at 25°C. and 2mA/cm² using a 0.05N– NaCl solution containing 100 ppm of sodium dodecylbenzenesulfonate. In No. 1, the time of passing electricity 5 minutes.
In Table 4, Nos. 1, 16 and 17 are comparisons.

EXAMPLE 4

Example 1 was repeated except that the concentration of sulfuric acid was adjusted to 95 percent, the

EXAMPLE 5

A soft polyvinyl chloride film was immersed for 16 hours at 25°C. in a mixed solution consisting of 100

Table 5

| | Time of treatment with sulfuric acid (hours) | Amount of sulfonic acid groups introduced (meq/g of dry membrane) | %[1] | $R_D/R_A$ | pH change[2] | Transport number (%) | Degree of contamination ΔE(mV)[3] |
|---|---|---|---|---|---|---|---|
| 1 | 0.1 | 0 | 0 | 1.00 | No change | 90.6 | 1050 |
| 2 | 1.5 | 0.051 | 2.1 | 1.15 | do. | 90.5 | 0 |
| 3 | 3.0 | 0.145 | 6.1 | 1.15 | do. | 90.5 | 0 |
| 4 | 6.0 | 0.286 | 12.0 | 1.20 | do. | 90.1 | 0 |

In Table 5, the meanings of [1], [2] and [3] are the same as [1], [2] and [3] in Table 4. No. 1 is a comparison.

parts of styrene, 10 parts of divinylbenzene, 1 part of benzoyl peroxide and 30 parts of kerosene. The film was then withdrawn and covered with a cellophane film, followed by heating for 25 hours at 70°C. using a hot press to form a base membrane. The base membrane was reacted in 98 percent sulfuric acid for 3 hours at 25°C., and then chloromethylated and aminated in the same way as in Example 1 to form an anion exchange membrane. The membrane obtained had a total ion exchange capacity of 2.12 meq/g of the dry membrane.

For comparison, the base membrane was not reacted in sulfuric acid, but was chloromethylated and aminated to form an anion exchange membrane.

The properties of these anion exchange membranes were examined, and the results are shown in Table 6. The organic anions used for measurement of the degree of contamination were dodecylbenzenesulfonic acid added in a concentration of 100 ppm.

water, and dried at reduced pressure. It was then chloromethylated and aminated under the same conditions as in Example 1 to form an anion exchange membrane which had the properties shown in Table 7.

The pH change (2) is the value obtained at a reaction temperature of 25°C. after passing electricity for one hour. If the temperature is 0° to −10°C., the pH value is one obtained after passing electricity for 3 hours at 2 mA/cm². The treating liquor was a 0.05N NaCl solution (25°C.) containing 100 ppm of sodium dodecylbenzenesulfonate.

The same base membrane as obtained in Example 1 was immersed in a mixed solution at 18°C. of 2 parts of sulfuric acid and 1 part of chlorosulfonic acid for the time indicated in Table 8 to chlorosulfonate the surface of the base membrane. The base membrane was then hydrolyzed with a 10 % aqueous solution of sodium hydroxide to introduce sulfonic acid groups, washed with water and then washed with alcohol, and dried at re- Table 6

| | Electric resistance ($\Omega cm^2$) | Transport number (%) | $R_D/R_A$ | Amount of sulfonic acid groups | | Degree of contamination $\Delta E(mV)$ | | |
|---|---|---|---|---|---|---|---|---|
| | | | | meq/g | %[1] | 0 | 1 hour | 6 hours |
| Anion exchange membrane of this Example | 3.8 | 88 | 1.2 | 0.11 | 5.2 | 0 | 0 | 0 |
| Anion exchange membrane of the comparison | 3.5 | 88 | 1.1 | — | — | 0 | 4850 | — |

[1]Percentage of the sulfonic acid groups based on the total ion exchange groups Table 7

| No. | Chlorosulfonating conditions | | Amount of sulfonic acid groups | | $R_D/R_A$ | pH change[2] | Transport number (%) | Degree of contamination $\Delta E(mV)$[3] |
|---|---|---|---|---|---|---|---|---|
| | Temp. (°C.) | Time | meq/g of the dry membrane | %[1] | | | | |
| 1 | 25 | 5 min. | 0.106 | 4.4 | 2.3 | + 10.7 − 2.9 | 90.1 | 0 |
| 2 | 25 | 10 min. | 0.237 | 9.8 | 3.1 | + 11.1 − 2.6 | 88.8 | 0 |
| 3 | 0~−10°C | 1 hr. | 0.05 | 2.1 | 1.2 | None | 90.3 | 0 |
| 4 | 0~−10°C | 2 hr. | 0.10 | 4.2 | 1.2 | None | 90.0 | 0 |

The meanings of [1] and [2] are quite the same as [1] and [3] in Table 4.
*Symbols + and − respectively designate an anode compartment and a cathode compartment.
Nos. 1 and 2 are comparisons.

EXAMPLE 6

The same base membrane as used in Example 1 was chlorosulfonated under the conditions shown in Table 7 using a mixture of 150 cc of 90 % chlorosulfonic acid and 600 cc. of 98 % sulfuric acid, and then hydrolyzed with a 10 % aqueous solution of sodium hydroxide at 25°C. for 3 hours. The membrane was washed with water, neutralized with 1N HCl, washed throughly with duced pressure. By the same procedure as in Example 1, the base membrane was chloromethylated and aminated to form an anion exchange membrane. The properties of this anion exchange membrane are shown in Table 8. The pH change and the degree of contamination were measured in the same way as in Example 4. The results shown in Table 8 were those of comparisons.

Table 8

| No. | Sulfonating time (minutes) | Amount of sulfonic acid groups (meq/g of the dry membrane) | (%)[1] | Alternate current density ($\Omega cm^2$) | $R_D/R_A$ | Transport number (%) | pH change | Degree of contamination $\Delta E(mV)$ |
|---|---|---|---|---|---|---|---|---|
| 1 | 2 | 0.018 | 0.75 | 2.2 | 17.0 | 90.0 | Anode compartment 11.5 Cathode compartment 3.0 | 750 |
| 2 | 5 | 0.12 | 5.0 | 2.9 | 25.0 | 90.0 | Anode compartment 11.6 Cathode compartment 2.95 | 0 |

[1] Percentage of the sulfonic acid groups based on the total ion exchange groups

EXAMPLE 7

The same base membrane as used in Example 1 was chlorosulfonated with a mixture of 75 cc of 90 % chlorosulfonic acid and 675 cc of sulfuric acid (98 %) at a reaction temperature of 25°C. for the time indicated in Table 9. The membrane was treated in the same way as in Example 6. The results are shown in Table 9.

Table 9

| No. | Chlorosulfonating time (minutes) | Amount of sulfonic acid groups meq/g of the dry membrane | %[1] | $R_D/R_A$ | pH change[2] | Transport number (%) | Degree of contamination[3] $\Delta E(mV)$ |
|---|---|---|---|---|---|---|---|
| 1 | 0 | 0 | 0 | 1.1 | No change | 91.7 | 1000 |
| 2 | 20 | 0.052 | 2.2 | 1.2 | do. | 91.0 | 0 |
| 3 | 35 | 0.095 | 4.0 | 1.2 | do. | 91.3 | 0 |

The meanings of [1], [2] and [3] are the same as in Table 7. No. 1 is a comparison.

What is claimed is:

1. An ion exchange membrane containing both cation exchange groups and anion exchange groups, said cation exchange groups being sulfonic acid groups which are present on the surface, or its vicinity, of the ion exchange membrane, the density of the sulfonic acid groups progressively decreasing from the surface of the membrane towards its interior, the amount of the sulfonic acid groups being 0.05 to 20 equivalent percent based on the total amount of the ion exchange groups, the amount of said anion exchange groups being 80 to 99.5 equivalent percent based on the total amount of the ion exchange groups, and said ion exchange membrane having a ratio of direct membrane current resistance to alternate current membrane resistance of not more than the limiting resistance ratio.

2. The ion exchange membrane of claim 1 wherein said limiting resistance ratio is 2.0 to 3.0.

3. The ion exchange membrane of claim 1 wherein the amount of said sulfonic acid groups is 0.1 to 10 equivalent percent based on the total ion exchange groups.

* * * * *